United States Patent
Huberman et al.

(10) Patent No.: US 8,296,253 B2
(45) Date of Patent: Oct. 23, 2012

(54) MANAGING ONLINE CONTENT BASED ON ITS PREDICTED POPULARITY

(75) Inventors: Bernardo Huberman, Palo Alto, CA (US); Gabor Jonas Szabo, Belmont, CA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 676 days.

(21) Appl. No.: 12/484,938

(22) Filed: Jun. 15, 2009

(65) Prior Publication Data

US 2010/0318484 A1    Dec. 16, 2010

(51) Int. Cl.
  *G06F 17/00* (2006.01)
  *G06F 7/60* (2006.01)
  *G06F 7/00* (2006.01)
(52) U.S. Cl. ............... 706/46; 703/2; 707/705
(58) Field of Classification Search ......... None
  See application file for complete search history.

(56) References Cited

U.S. PATENT DOCUMENTS

| 7,373,599 B2 | 5/2008 | McElfresh |
| 2010/0138271 A1* | 6/2010 | Henkin et al. ............... 705/10 |

OTHER PUBLICATIONS

Gabor Szabo, Bernardo A. Huberman, "Predicting the popularity of online content," http://arxiv.org/abs/0811.0405, arXiv:0811.0405v1 [cs.CY] (Nov. 4, 2008).

* cited by examiner

*Primary Examiner* — Alan Chen (57) ABSTRACT

A historical popularity value is determined for a user-selectable online content from historical data describing user accesses to the user-selectable online content over a selected period. A predicted popularity value describing future popularity of the user-selectable online content at a future time after the selected period is ascertained from the historically popularity value. A web site from which user-selectable online content is accessible is managed based on the predicted popularity value.

21 Claims, 5 Drawing Sheets

---

Determine A Historical Popularity Value For A User-selectable Online Content From Historical Data Describing User Accesses To The User-selectable Online Content Over A Selected Period ⟵ 30

Ascertain From The Historically Popularity Value A Predicted Popularity Value Describing Future Popularity Of The User-selectable Online Content At A Future Time After The Selected Period ⟵ 32

Manage A Web Site From Which User-selectable Online Content Is Accessible Based On The Predicted Popularity Value ⟵ 34

MANAGING ONLINE CONTENT BASED ON ITS PREDICTED POPULARITY

BACKGROUND

The ubiquity and inexpensiveness of online services have transformed the landscape of how content is produced and consumed online. Thanks to the web, it is possible for content producers to reach out to audiences with sizes that are inconceivable using conventional channels. Examples of the services that have made this exchange between producers and consumers possible on a global scale include video, photo, and music sharing, weblogs and wikis, social bookmarking sites, collaborative portals, and news aggregators where content is submitted, perused, and often rated and discussed by the user community. At the same time, the dwindling cost of producing and sharing content has made the online publication space a highly competitive domain for authors.

The ease with which content can now be produced brings to the center the problem of the attention that can be devoted to it. Online content portals face the problem of ranking, prioritizing, and displaying their content. Such portals include online shops (hpshopping.com), news outlets (nytimes.com), community portals with user-created content (wikipedia.org), or media sharing services (flickr.com, youtube.com). These content providers vie for users' limited attention by resorting to a number of strategies aimed at maximizing the number of clicks devoted to their web sites. These strategies range from data personalization and short videos to the dynamic rearrangement of items in a given page, to name a few. In all these cases, the ultimate goal is the same: to draw the attention of the visitor to a website before she proceeds to the next one. A variety of different factors, such as the location and size of the user-selectable content on a web page, affect the amount of attention that a particular user-selectable content will receive. For example, user-selectable contents appearing at the top of a web page typically will generate more page clicks than user-selectable contents appearing at the bottom of the web page. The goal for many content providers is to optimize these factors so as to maximize the number of clicks on the web page. Most often, online content portals rank and categorize content based on its past popularity and appeal to users. This is especially true of aggregators of user-contributed content where the "wisdom of the crowd" is used to provide collaborative filtering facilities to select submissions that are favored by many.

What are needed are improved systems and methods of managing online content.

SUMMARY

In one aspect, the invention features a method in accordance with which a historical popularity value is determined for a user-selectable online content from historical data describing user accesses to the user-selectable online content over a selected period. A predicted popularity value describing future popularity of the user-selectable online content at a future time after the selected period is ascertained from the historically popularity value. A web site from which user-selectable online content is accessible is managed based on the predicted popularity value.

The invention also features apparatus operable to implement the method described above and computer-readable media storing computer-readable instructions causing a computer to implement the method described above.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Definition of Terms

The term "online" means being accessible over a computer network (e.g., the internet).

A "computer" is any machine, device, or apparatus that processes data according to computer-readable instructions that are stored on a computer-readable medium either temporarily or permanently. A "computer operating system" is a software component of a computer system that manages and coordinates the performance of tasks and the sharing of computing and hardware resources. A "software application" (also referred to as software, an application, computer software, a computer application, a program, and a computer program) is a set of instructions that a computer can interpret and execute to perform one or more specific tasks. A "data file" is a block of information that durably stores data for use by a software application.

The term "user-selectable content" refers broadly to any visually perceptible element (e.g., images and text) of a web page that is associated with a respective interface object (e.g., a link to a network resource or other control that is detectable by a web server) that is responsive to a user's execution command (e.g., click) with respect to the user-selectable content.

The term "web page" refers to any type of resource of information (e.g., a document, such as an HTML or XHTML document) that is suitable for the World Wide Web and can be accessed through a web browser. A web page typically contains information, graphics, and hyperlinks to other web pages and files. A "web site" includes one or more web pages that are made available through what appears to users as a single web server. A "slot" refers to a position on a web page that contains user-selectable content that can be changed dynamically (e.g., each time the web page is refreshed).

The term "click" refers to the act or operation of entering or inputting an execution command (e.g., clicking the left computer mouse button).

A "link" refers to an object (e.g., a piece of text, an image or an area of an image) that loads a hypertext link reference into a target window when selected. A link typically includes an identifier or connection handle (e.g., a uniform resource identifier (URI)) that can be used to establish a network connection with a communicant, resource, or service on a network node.

II. Overview

Figure 1:
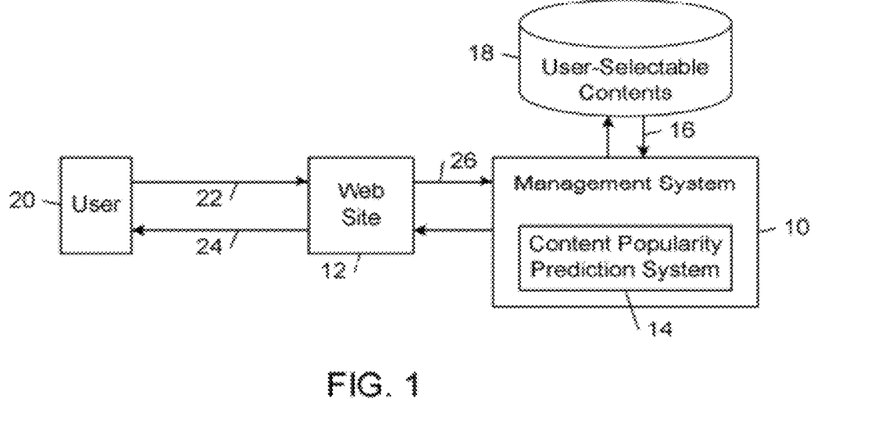
FIG. 1 is a block diagram of an embodiment of a system for managing a web site.

FIG. 1 shows a block diagram of an embodiment of a management system 10 that manages a web site 12 based on the predicted popularity of user-selectable contents (e.g., advertisements, topic tiles, and other variable contents) that are accessible from the web site. The management system 10 includes a content popularity prediction system 14 that is able to predict the future popularity (e.g., the number of views, downloads, or clicks) of individual contents (e.g., products, articles, and files) over time from early observations of the initial popularity of those contents and the aggregate user access history of the web site 12. These predictions are particularly useful in a wide range of web site management applications that can benefit from anticipation of the future interest in individual content. Among the exemplary types of applications for such content popularity predictions are the following:

- positioning the most/least popular content on highly visible parts of the portal;
- predicting linked advertisement revenue based on the number of impressions (e.g., clicks);
- anticipating the sales of products when it is related to the number of page views;
- workload prediction, the most popular content can be cached for faster access;
- ranking of content may be based not on present, but on expected future popularity;
- the daily cycles in user activity are automatically controlled for to give the best estimate.

In the illustrated embodiments, the web site 12 includes one or more web pages that have variable content slots. These slots typically are populated with user-selectable contents 16 that are selected from a database 18 (or from some other source). The web site 12 typically is hosted by a web server. In some embodiments, the management system 10 is implemented on the web server that hosts the web site 12. In other embodiments, the management system 10 is implemented on another server that responds to requests from the web server for a prioritized ordering of the selected ones of the user-selectable contents 16 on the one or more pages of the web site 12. In these embodiments, the user-selectable contents 16 may be selected by the web server, the management system 10, or another server (e.g., an advertisement server).

A user 20 interacts with the web site 12 by sending a request 22 to the web server for a page of the web site 12. In response, the web server returns the requested page 24 to the user 20. Historical data characterizing the user's interactions with the web site, including user selections of user-selectable contents on the one or more web pages, are collected and analyzed using analytical methods (e.g., the methods provided by Google® analytics software). This data may be collected and analyzed by the web server or by another server. The results 26 of the analysis of the relevant historical data typically are transmitted to the management system 10 for use in, for example, forecasting linked advertisement revenue, forecasting product sales quantities, and determining the prioritization ordering of the user-selectable contents 16.

The web server typically refreshes the web page 24 on a regular cycle (e.g., every five minutes). In some embodiments, the management system 10 determines a prioritization order of the selected user-selectable contents during each refresh period. On each web page, the variable content slots typically are prioritized by the likely amounts of attention that user-selectable contents are expected to receive from users when they are placed in those slots. In some embodiments, the variable content slots are prioritized by their respective positions on the web page. For example, a user-selectable content in a variable content slot at the top of a web page typically draws more attention than a similar user-selectable content. If the prioritization ordering of the contents changes, the user-selectable contents in the variable content slots of the web page are changed as needed in the following refresh of the page to reflect the changed prioritization order.

Figure 2:
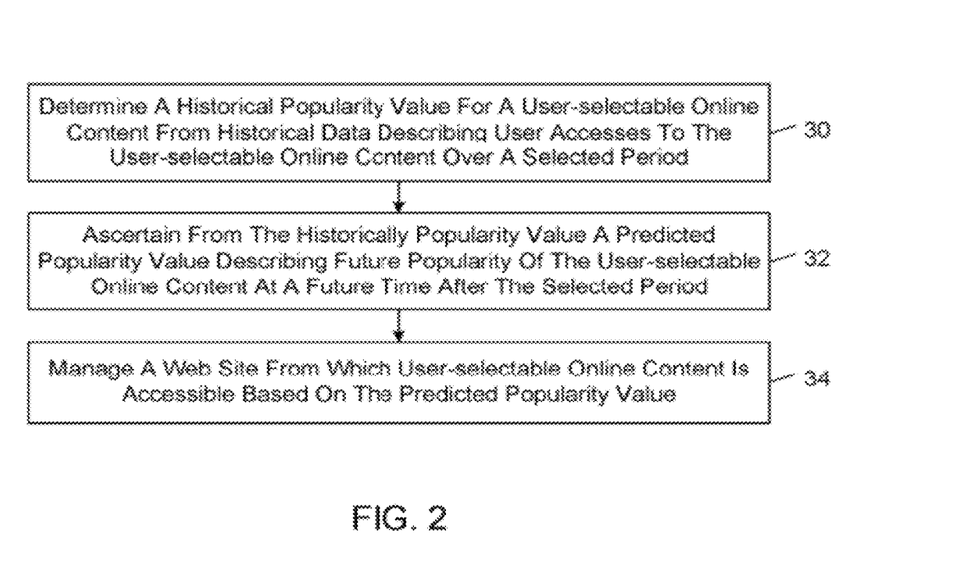
FIG. 2 is a flow diagram of an embodiment of a method of management a web site.

FIG. 2 shows an embodiment of a method by which the management system 10 manages the web site 12. In accordance with the method of FIG. 2, the content popularity prediction system 14 determines a historical popularity value for a user-selectable online content from historical data describing user accesses to the user-selectable online content over a selected period (FIG. 2, block 30). The content popularity prediction system 14 ascertains from the historically popularity value a predicted popularity value describing future popularity of the user-selectable online content at a future time after the selected period (FIG. 2, block 32). The management system 10 manages the web site 12 from which user-selectable online content is accessible based on the predicted popularity value (FIG. 2, block 34).

The elements of the method of FIG. 2 are described detail below in the following section.

III. Managing Online Content Based on its Predicted Popularity

A. Predicting Popularity of Online Content

1. Introduction

Figure 3:
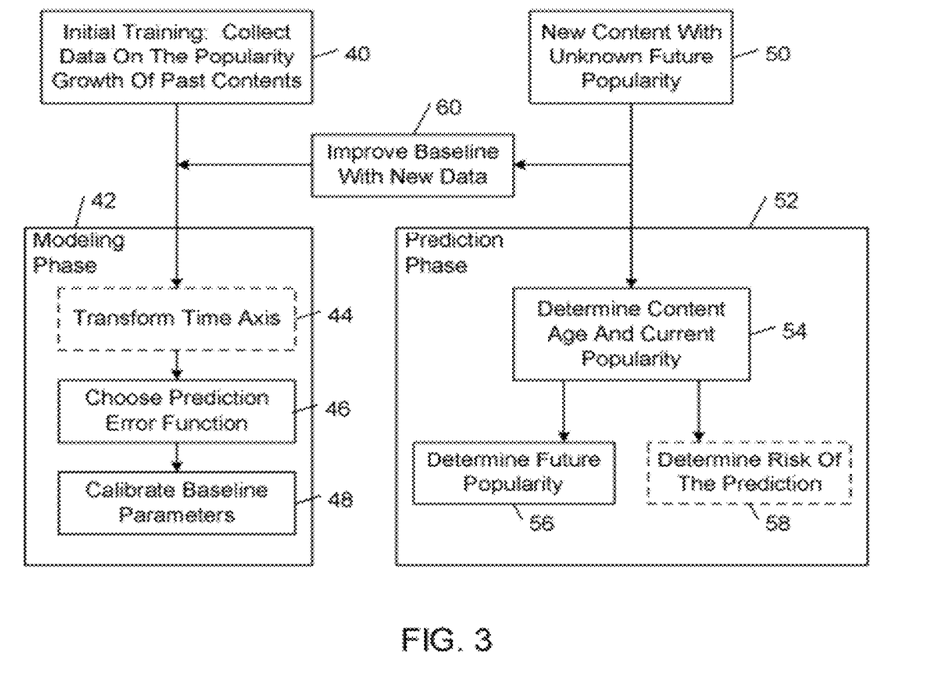
FIG. 3 is a flow diagram of an embodiment of a method of predicting the popularity of a user-selectable online content.

FIG. 3 shows an embodiment of a method by which the content popularity prediction system 14 predicts the popularity of user-selectable online content. In accordance with this method, the content popularity prediction system 14 performs an initial training process in which data on the popularity growth of past contents on the web site 12 are collected (FIG. 3, block 40).

The content popularity prediction system 14 uses the collected data in a modeling phase in which the content popularity prediction system 14 determines a predictive model of the popularity of online content available on the web site 12 (FIG. 3, block 42). In some embodiments, the content popularity prediction system 14 models the growth of the popularity by a random process that is the result of an average baseline best expectation for the content, plus a random noise term that encapsulates the content's individual deviation from the average. The modeling phase involves determining a baseline relationship between content popularity as a function of content age based on the collected historical training data. In this process, the age of the content oftentimes is determined from a transformation (re-scaling) of the actual content age that mitigates the dependence of content popularity on the time of day when content is made available (e.g., submitted by users) (FIG. 3, block 44). The content popularity prediction system 14 selects the prediction error function, which typically depends on the type of content and the way in which users relate to the content on the web site 12 (FIG. 3, block 46). The content popularity prediction system 14 then calibrates the baseline parameters of the predictive model based on the transformed historical data (FIG. 3, block 48). The baseline multipliers as a function of time are determined in accordance with what error function is to be minimized. As described in detail below, the baseline multipliers will differ for absolute and relative error measures; in general, however, the way the prediction is carried out is independent of the modeling phase, only the parameter values are different. The modeling phase involves observing a set of contents for time series data on their popularities, and determining the baseline multipliers that will give the best expected predictions for the new unknown content.

For each new content whose future popularity is to be forecasted (FIG. 3, block 50), the content popularity prediction system 14 enters a prediction phase in which it determines a predicted popularity value describing future popularity of the new content at a future time (FIG. 3, block 52). In this process, the content popularity prediction system 14 determines the (typically transformed) age and current popularity of the content is determined (FIG. 3, block 54). The content popularity prediction system 14 determines the future popularity of the content based on its present age and the baseline function value as determined for that age in the modeling phase (FIG. 3, block 56). In this process, the present value of the popularity typically is multiplied by the baseline scalar to arrive at the popularity at the later time. This is the best estimate of that popularity, but it typically will differ from the eventual popularity. In some embodiments, the content popularity prediction system 14 also determines the risk associated with the prediction (FIG. 3, block 58). The degree of deviation from the actual popularity is associated with the risk of the prediction. The smaller the expected deviation, the more accurate the prediction will be, and this is a fundamental measure of the performance of the prediction.

The content popularity prediction system 14 also adds the data associated with the new content to the training set, which incrementally improves the calibration of the baseline parameters (FIG. 3, block 60).

2. Collecting Data on the Popularity Growth of Past Contents

As explained above, the content popularity prediction system 14 performs an initial training process in which data on the popularity growth of past contents on the web site 12 are collected (FIG. 3, block 40). The term "popularity" refers to a metric that measures the number of times that an online content is selected or otherwise accessed by users of the web site 12. The actual metric may vary depending on the content and the way in which users interact with the content. For example, the popularity metric may measure the number of actual user selections (e.g., clicks or impressions) of the content or it may measure a score or vote that is given by users to the content. In the case of a story on the Digg web site, the popularity of the story is the number of votes (diggs) that a story collects. In the case of a video on the Youtube web site, on the other hand, the popularity of the video is the number of views that the video receives.

In the process of modeling the relationship between the popularity of a given online content and its age, the content popularity prediction system 14 may have to normalize the historical data describing user accesses to the user-selectable online content. For example, the initial number of user accesses oftentimes depends on the time of day when the given online content is made available. For example, it is been observed that stories on the Digg web site will differ greatly on the number of initial diggs that they get depending on the time of day when a content submission is made to the portal. In particular, stories submitted at less active periods of the day typically accrue less diggs in the first few hours initially than stories submitted during peak times. This is a natural consequence of suppressed digging activity during the nightly hours, but may initially penalize interesting stories that will ultimately become popular. In other words, based on observations made only after a few hours after a story has been promoted, a story's relative interestingness may be misinterpreted if the number of diggs is not corrected to account for the variation in daily activity cycles. For instance, a story that gets promoted at noon will on average get approximately 400 diggs in the first 2 hours, while it will only get 200 diggs if it is promoted at midnight.

In these cases, the age of the content is determined from a transformation (re-scaling) of the actual content age that mitigates the dependence of content popularity on the time of day when content is made available (e.g., submitted by users). For example, with respect to the Digg web site, actual time is transformed to digg time, where age is measured not by actual time (seconds), but by the number of all diggs that users cast on promoted stories. For example, it has been determined that the average number of diggs arriving to promoted stories per hour is 5,478 when calculated over the full data collection period. In some embodiments, one digg hour is defined as the time it takes for 5,478 new diggs to be cast. During the night, this process typically will take about three times longer than during the active daily periods. This transformation of the time dimension mitigates the dependence of content popularity on the time of day when it was submitted. In these embodiments, the age of a content submission in digg hours at a given time t corresponds to the number of diggs that were received for the story between time t and the time the story was submitted, divided by 5,478.

3. Modeling and Predicting Content Popularity Over Time a. Overview

As explained above, the content popularity prediction system 14 determines a predictive model of the popularity of online content available on the web site 12 (FIG. 3, block 42).

In the illustrated embodiments, the content popularity prediction system 14 performs a logarithmic transformation on the historical content popularities. The transformed variables exhibit strong correlations between early and later times, and on this scale the natural random fluctuations can be expressed as an additive noise term. As used herein, the term reference time $t_r$ refers to the time of the predicted popularity of a content whose age with respect to the initial acess time (e.g., the upload or promotion time) is $t_r$. The term indicator time $t_i$ (where $t_i < t_r$) refers to the time in the life cycle (or age) of the content the prediction is performed, or in other words how long the content access history is observed before making the prediction.

In an in-depth analysis of historical content access data shows strong linear correlations between early and later times of the logarithmically transformed content popularities, with correlation coefficients between early and late times well exceeding 0.9. This suggests that the more popular contents are in the beginning, the more popular they will be also later on. The connection is described by the following linear model:

$$\ln N(t_r) = \ln[r(t_i, t_r)N(t_i)] + \xi(t_i, t_r) \qquad (1)$$

$$= \ln r(t_i, t_r) + \ln N(t_i) + \xi(t_i, t_r)$$

where N(t) is the popularity of a particular content at time t. The factor $r(t_i,t_r)$ accounts for the linear relationship found between the log-transformed popularities at different times. The parameter $\xi$ is a noise term that accounts for the natural variances in individual content dynamics beyond the expected trend, and in the model it is drawn from a fixed distribution with mean 0. This term describes the randomness observed in the data. As shown in equation (1), the noise term is additive on the log-scale of popularities. This is justified by the fact that the strongest correlations were found on this transformed scale.

Figure 4A:
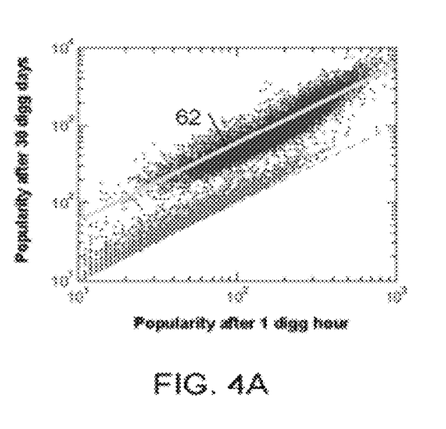
FIGS. 4A and 4B are graphs of popularity of user-selectable online contents plotted over respective periods for two different respective web sites.
Figure 4B:
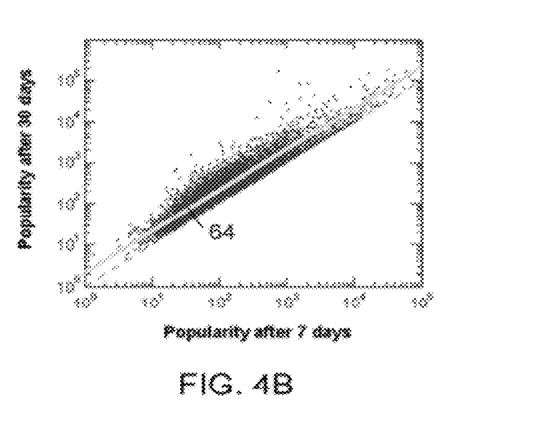

FIG. 4A shows the correlation between digg counts on 17,097 promoted stories in a dataset that are older than 30 days. A k-means clustering separates 89% of the stories into the upper cluster, while the rest of the stories is shown in lighter color. The bold guide line 62 indicates a linear fit with slope 1 on the upper cluster, with a prefactor of 5.92 (the Pearson correlation coefficient is 0.90). The dashed line marks the y=x line below which no stories can fall. FIG. 4B shows the popularities of Youtube videos shown at the 30th day after upload, versus their popularity after 7 days. The bold solid line 64 with gradient 1 has been fit to the data, with correlation coefficient R=0.77 and prefactor 2.13. As shown in FIGS. 4A and 4B, the popularities at $t_r$ also appear to be evenly distributed around the linear fit (with taking only the upper cluster in FIG. 4A and considering the natural cutoff y=x in the data for Youtube). The noise term (as given by the residuals after a linear fit on both the Youtube and the Digg data) is well described by a normal distribution on the logarithmic scale.

An alternative explanation for the observed correlations above is given in the following. If $t_i$ is allowed to vary in equation (1), the popularity at the given time $t_r$ is described by the following formula, assuming that the noise term in the model is distributed normally ($t_0$ is an early point in time after submission/promotion):

$$\ln N(t_r) = \ln N(t_0) + \sum_{\tau=t_0}^{t_r} \eta(\tau). \quad (2)$$

The parameter $\eta(\tau)$ is a random value drawn from an arbitrary, fixed distribution, and $\tau$ is taken in small, discrete time steps. This formulation is based on the observation that the sum of a large number of independent random variables each following the same given distribution will approximate a normal distribution, no matter how the individual random variables were distributed. This is the result of the central limit theorem of probability. The model described in equation (2) results from the view of the growth of content popularity as a large number of random events increasing the logarithm of the popularity by a small, random amount. What follows from this is that on the natural, linear scale of popularities we have to multiply the actual popularity by a small, random amount to obtain the popularity for the next time step. This process is called growth with random multiplicative noise, and it is a surprising characteristic of the dynamics of user-submitted content. While the increments at each time step are random, their expectation value over many time steps adds up, and will ultimately correspond to $\ln r(t_0,t_r)$ in equation (1) above. Thus the innate differences among the interestingness of contents should be seen early on, up to a variability accounted for by the noise terms.

To illustrate how one can use the random logarithmic growth model of content popularity on Digg and Youtube, extrapolations from historical popularity data were performed to predict future popularity rates. The strong correlation between early and later times suggests that a content that is popular in the beginning will be popular later on, too. The content popularity prediction system 14 leverages the linearity of the popularity accrual with a random additive noise on the logarithmic scale to approximate the popularity (e.g., the number of views/diggs) at any given time in the future: they will be predicted as a constant product of the popularity measured at an earlier time. The multiplier, however, depends on when the sampling and the prediction are performed, respectively.

b. Popularity Prediction Models

This section describes three exemplary models for predicting an individual content's popularity at a future time $t_r$ from a measure of the popularity of the content when its age is $t_i$. The performances of the predictions made by these models are measured on the test sets by defining error functions that yield a measure of deviation of the predictions from the observed popularities at $t_r$. In the following description, the $\hat{x}$ notation refers to the predicted value of x at $t_r$.

i. LN Model: Linear Regression on a Logarithmic Scale; Least-Squares Absolute Error In some embodiments, the content popularity prediction system 14 models the linear relationship between the popularity of a content at a given time and the popularity at a later time (see equation (1)) based on a least squares estimate, where the future popularity value is the best estimate that minimizes the sum of the squared residuals (a consequence of the linear regression with the maximum likelihood method). Since the linear regression assumes normally distributed residuals and the lognormal model gives rise to additive Gaussian noise only if the logarithms of the popularities are considered, the overall error that is minimized by the linear regression on this scale is given by equation (3):

$$LSE^* = \sum_c r_c^2 = \sum_c [\ln N_c(t_i, t_r) - \ln N_c(t_r)]^2, \quad (3)$$

where $\ln N_c(t_i,t_r)$ is the prediction for $\ln N_c(t_i)$, and is calculated as $\ln N_c(t_i,t_r) = \beta_0(t_i) + \ln N_c(t_i)$ and $\beta_0$ is yielded by the maximum likelihood parameter estimator for the intercept of the linear regression with slope 1. The sum in equation (3) goes over all content c in the training set when estimating the parameters, and the test set when estimating the error. In some embodiments, the error is expressed on the linear scale in accordance with equation (4):

$$LSE = \sum_c [\hat{N}_c(t_i, t_r) - N_c(t_r)]^2. \quad (4)$$

The residuals, while distributed normally on the logarithmic scale, will not have this property on the untransformed scale, and an inconsistent estimate would result if we used $\exp[\ln N_c(t_i,t_r)]$ as a predictor on the natural (original) scale of popularities. Instead, in the case in which the transformation of the dependent variable is logarithmic, the best untransformed scale estimate is given by equation (5):

$$\hat{N}_s(t_i,t_r) = \exp[\ln N_s(t_i) + \beta_0(t_i) + \sigma_0^2/2] \quad (5)$$

Here $\sigma_0^2 = \text{var}(r_c)$, which is the consistent estimate for the variance of the residuals on the logarithmic scale. In accordance with the LN model, the content popularity prediction system 14 estimates the expected popularity of a given content s at time $t_r$ from measurements at time $t_i$, by determining the regression coefficient $\beta_0(t_i)$ and the variance of the residuals $\sigma_0^2$ from the training set, and applying equation (5) to obtain the expectation on the original scale, using the popularity $N_s(t_i)$ measured for content s at $t_i$.

ii. CS Model: Constant Scaling Model; Relative Squared Error

In some embodiments, the content popularity prediction system 14 models the linear relationship between the popularity of a content at a given time and the popularity at a later time (see equation (1)) based on a constant scaling model. In this section, first the error function that is minimized is defined, and then a linear estimator for the predictions is presented.

The relative squared error that is used in the constant scaling (CS) model takes the form of:

$$RSE = \sum_c \left[\frac{\hat{N}_c(t_i, t_r) - N_c(t_r)}{N_c(t_r)}\right]^2 = \sum_c \left[\frac{\hat{N}_c(t_i, t_r)}{N_c(t_r)} - 1\right]^2. \quad (6)$$

This is similar to the commonly used relative standard error:

$$\left|\frac{\hat{N}_c(t_i, t_r) - N_c(t_r)}{N_c(t_r)}\right|, \quad (7)$$

except that the absolute value of the relative difference is replaced by a square.

The constant scaling model is based on the expression of the future expected value $\hat{N}_s(t_i,t_r)$ for content s as:

$$\hat{N}_s(t_i,t_r) = \alpha(t_i,t_r) N_s(t_i) \quad (8)$$

where $\alpha(t_i,t_r)$ is independent of the particular content s, and only depends on the indicator and reference times. The value that $\alpha(t_i,t_r)$ takes, however, will be contingent on what the error function is, so that the optimal value of $\alpha$ minimizes this. We will minimize RSE on the training set if and only if $$0 = \frac{\partial RSE}{\partial \alpha(t_i, t_r)} = 2\sum_c \left[\frac{N_c(t_i)}{N_c(t_r)}\alpha(t_i, t_r) - 1\right]\frac{N_c(t_i)}{N_c(t_r)}. \quad (9)$$

Expressing $\alpha(t_i,t_r)$ from above, $$\alpha(t_i, t_r) = \frac{\sum_c \frac{N_c(t_i)}{N_c(t_r)}}{\sum_c \left[\frac{N_c(t_i)}{N_c(t_r)}\right]^2}. \quad (10)$$

The value of $\alpha(t_i,t_r)$ can be calculated from the training data for any $t_i$, and further, the prediction for any new content may be made knowing its age using this value from the training set, together with equation (8). If the error is verified on the training set itself, it is guaranteed that RSE is minimized under the model assumptions of linear scaling.

iii. GP Model: Growth Profile Model

In some embodiments, the content popularity prediction system 14 models the linear relationship between the popularity of a content at a given time and the popularity at a later time (see equation (1)) based on average growth profiles devised from the training set. This model assumes in essence that the growth of a content's popularity in time follows a uniform accrual curve, which is appropriately resealed to account for the differences between content popularities. The growth profile is calculated on the training set as the average of the relative popularities of the contents of a given age $t_i$, as normalized by the final popularity at the reference, $t_r$:

$$P(t_0, t_1) = \left\langle\frac{N_c(t_0)}{N_c(t_1)}\right\rangle_c, \quad (11)$$

where $\langle\cdot\rangle_c$ takes the mean of its argument over all content c in the training set. The rescaled growth profile is assumed to approximate the observed popularities well over the whole time axis with an affine transformation, and thus at $t_i$ the resealing factor $\Pi_s$ is given by $N_s(t_i) = \Pi_s(t_i, t_r)P(t_i,t_r)$. The prediction for $t_r$ consists of using $\Pi_s(t_i,t_r)$ to calculate the future popularity, $$\hat{N}_s(t_i, t_r) = \Pi_s(t_i, t_r)P(t_r, t_r) = \Pi_s(t_i, t_r) = \frac{N_s(t_i)}{P(t_i, t_r)}. \quad (12)$$

Figure 5:
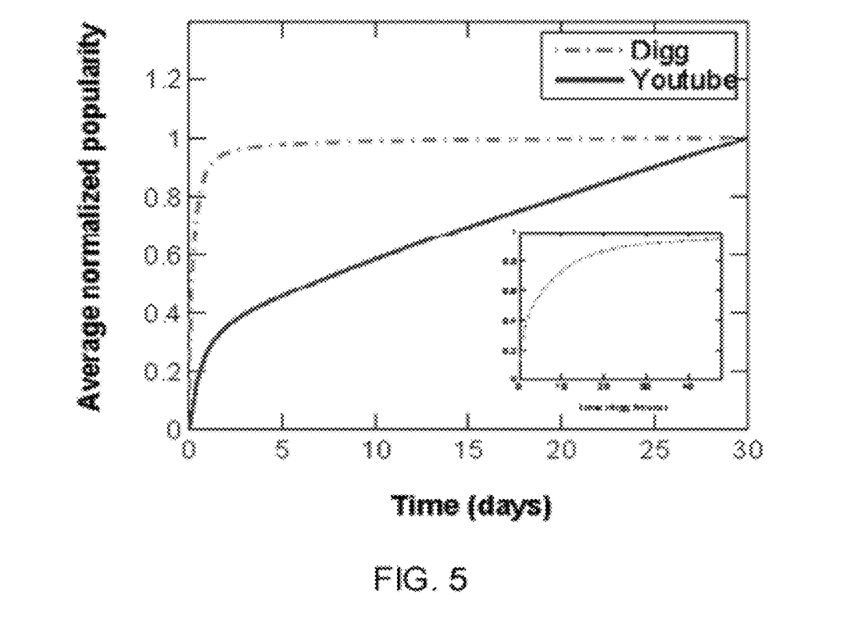
FIG. 5 is graph of average normalized popularities of online contents of a particular age on two different web sites.

The growth profiles for Youtube and Digg were measured and the resulting measurements are shown in FIG. 5. In particular, FIG. 5 shows the average normalized popularities of contents for Youtube and Digg by the popularity at day 30. The inset shows the same for the first 48 digg hours of Digg contents.

iv. Exemplary Embodiments of the Content Popularity Prediction System

In some embodiments, the CS model is used when relative error measures are chosen (FIG. 3, block 46), and the LN model is used when absolute measures are chosen (FIG. 3, block 46).

4. Experimental Results

For verification of the prediction method of FIG. 3, data was collected from two Web 2.0 portals, Youtube (youtube.com) and Digg (digg.com). Youtube is the largest and most frequented video sharing portal today, where registered users can submit short videos that they created, and visitors to the site can search for and watch them. The measure of popularity is the number of views that a video gets, and Youtube ranks videos by this and places the ones that are most viewed on prominent parts of the portal. Digg is a collaborative filtering tool for Web content: users will submit links to interesting news, videos, and pictures on the Web, which can be voted on by other users if they also find them interesting. The content submission that collects enough votes gets "promoted" to the front page of Digg, and users will also be ranked by their success rate of proposing promoted stories. The transformation process used in block 44 of the modeling phase 42 is used to correct for the observed varying activity levels that give rise to frequent voting on Digg stories that are submitted during the daytime but penalizes contents that appear at the low-activity nightly hours.

According to measurements on Youtube and Digg, content popularity grows very quickly after the introduction of the content, and usually levels out as the content gradually moves on to less visited sections of the portal or as interest decays in it. Although there are large differences among content with regards to the speed at which they start to accumulate views, in general the popularity at a later stage in time is linearly proportional to the popularity as measured at an early time. The exact correspondence between popularities of early and late times can be described with a so-called stochastic process, which on one hand contains the linear scaling function between the popularities as a baseline, and on the other a random noise term. The noise term is expected and necessary since downloads are the result of the collective action of all users which is bound to show random effects.

The measure of the accuracy is the sample error function, which is the arithmetic mean of the individual errors yielded for the contents in the verification set after training. The individual errors, however, may be interpreted in two ways by convention. First, the deviation can be measured as an absolute difference of the prediction from the actual popularity; second, it can be expressed as the relative fraction of the total (percentages). In the case of online portals, the nature of randomness in user access results in an absolute error function that has a large dispersion. That is, the absolute difference between the prediction and the reference has a considerable uncertainty, although the mean of the error is reasonably low. For the relative error function, however, the dispersion of the average error is considerably smaller; in other words, the predictions stay in a confined range around the expectation. The consequence of this is that it typically is desirable to use the relative error to assess the accuracy of the prediction. Where it is not possible (for instance in ranking content by popularity), we expect to see stronger inconsistencies with respect to the real values.

In addition, the noise term that describes the fluctuations is additive with respect to the average baseline only after a logarithmic transformation of the popularities. This means that on the natural linear scale, the fluctuations of the popularities of individual content in time will be described by a multiplicative noise term that gives rise to the large error margins as described above if the absolute error is considered.

The performance of the prediction models described above are assessed below using two error functions that are analogous to LSE and RSE, respectively. In this process, the content access time series data were subdivided into a training set and a test set, on which the different prediction schemes are benchmarked. For Digg, all stories that were submitted during the first half of the data collection period are selected as the training set, and the second half was considered as the test set. For Youtube, 50% of 7,146 Youtube videos were randomly selected as the training set and the other half were selected as the test set. The numbers of contents that the training and test sets contain are summarized in Table 1. The parameters defined in the prediction models were found through linear regression ($\beta_0$ and $\sigma_0^2$) and sample averaging ($\alpha$ and P), respectively.

TABLE 1

The partitioning of the collected data into training and test sets. The Digg data is divided by time while the Youtube videos are chosen randomly for each set, respectively.

|  | Training set | Test set |
| --- | --- | --- |
| Digg | 10825 stories (Jul. 1, 2007-- Sep. 18, 2007) | 6272 stories (Sep. 18, 2007-- Dec. 6, 2007) |
| Youtube | 3573 videos randomly selected | 3573 videos randomly selected |

Thirty days after the content submission time was selected as the reference time $t_r$ at which the popularity of each content is predicted. Since the predictions naturally depend on $t_i$ and how close we are to the reference time, the parameter estimations were performed in hourly intervals starting after the introduction of any content.

Analogously to LSE and RSE, the following prediction error measures were considered for each particular content s:

$$QSE(s, t_i, t_r) = \left[\hat{N}_s(t_i, t_r) - N_s(t_r)\right]^2 \quad (13)$$

and $$QRE(s, t_i, t_r) = \left[\frac{\hat{N}_s(t_i, t_r) - N_s(t_r)}{N_s(t_r)}\right]^2. \quad (14)$$

$QSE(S,t_i,t_r)$ is the squared difference between the prediction and the actual popularity for a particular content s, and QRE is the relative squared error. We will use this notation to refer to their ensemble average values, too, $QSE = \langle QSE(c,t_i,t_r)\rangle_c$, where c goes over all contents in the test set, and similarly, $QRE=\langle QRE(s,t_i,t_r)\rangle_c$. The parameters obtained in the modeling phase were used to perform the predictions on the test set, and plotted the resulting average error values calculated with the above error measures. FIGS. 6A-6D show the absolute squared error (QSE) and the relative squared error (QRE) as a function of $t_i$, together with their respective standard deviations. The indicator time $t_i$ is measured from the time a video is presented in the recent list or when a story gets promoted to the front page of Digg.

Figure 6A:
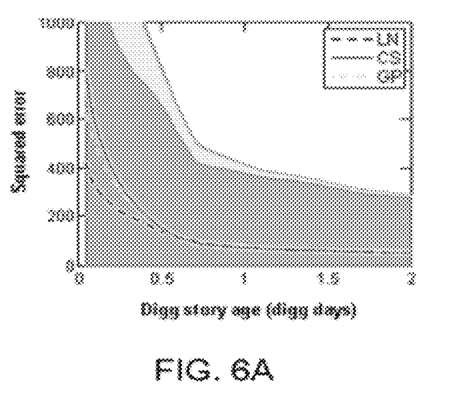
FIGS. 6A-6B are graphs of two different respective error function measures plotted as a function of age of online contents for a first web site.
Figure 6B:
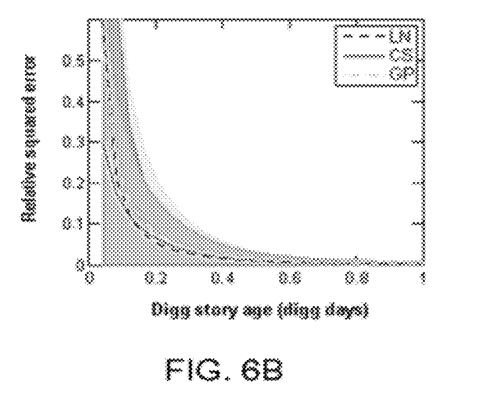
Figure 6C:
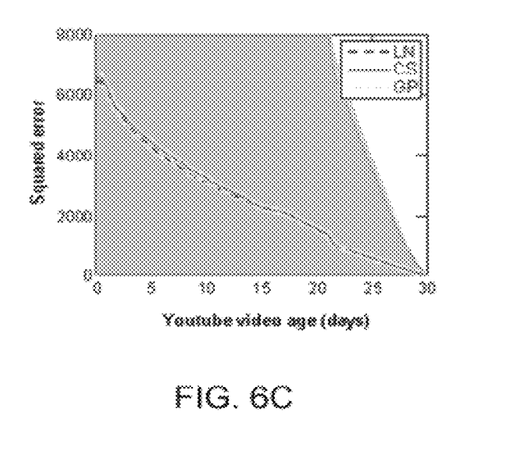
FIGS. 6C-6D are graphs of different respective error function measures plotted as a function of age of online contents for a second web site.

As shown in FIGS. 6A and 6B, the squared error (QSE) is smallest for the LN model for Digg stories in the beginning, then the difference between the three models becomes modest. This is expected since the LN model optimizes for the RSE objective function, which is equivalent to QSE up to a constant factor. Youtube videos do not show remarkable differences against any of the three models, however. A further difference between Digg and Youtube is that QSE shows considerable dispersion for Youtube videos over the whole time axis, as can be seen from the large values of the standard deviation (the shaded areas in FIGS. 6A-6D). This is understandable, however, if we consider that the popularity of Digg news saturates much earlier than that of Youtube videos.

Figure 6D:
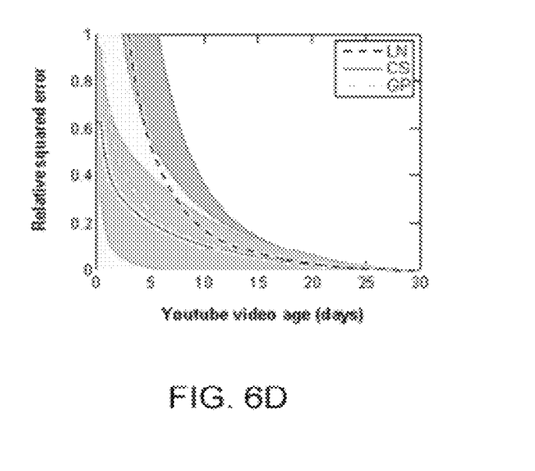

As shown in FIGS. 6B and 6D, the relative expected error QRE decreases very rapidly for Digg (after 12 hours it is already negligible), while the predictions converge slower to the actual value in the case of Youtube. Here, however, the CS model outperforms the other two for both portals, again as a consequence of fine-tuning the model to minimize the objective function RSE. It is also apparent that the variation of the prediction error among contents is much smaller than in the case of QSE, and the standard deviation of QRE is approximately proportional to QRE itself. The explanation for this is that the noise fluctuations around the expected average as described by equation (1) are additive on a logarithmic scale, which means that taking the ratio of a predicted and an actual popularity as in QRE is translated into a difference on the logarithmic scale of popularities. The difference of the logs is commensurate with the noise term in equation (1), thus stays bounded in QRE, and is instead amplified multiplicatively in QSE.

Figure 7:
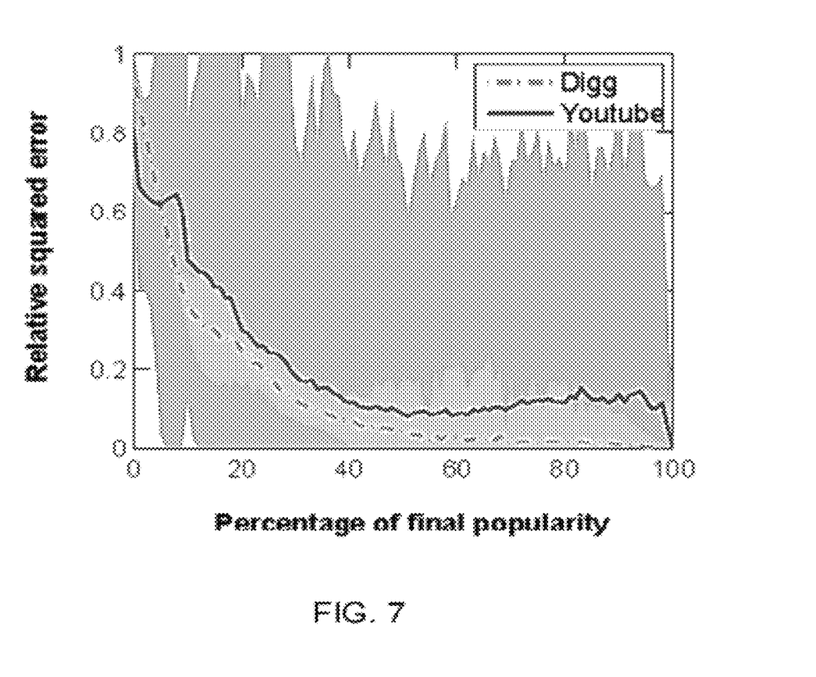
FIG. 7 is a graph of relative squared error values plotted as a function of the percentage of the final popularities of online contents of a particular age for two different web sites.

In FIG. 7 the relative squared error (QRE) is plotted as a function of the actual popularity, expressed as the fraction of reference value $N_s(t_r)$. The plots are averages over all content in the test set, and over times $t_i$ in hourly increments up to $t_r$. This means that the predictions across Youtube and Digg become comparable, since we can eliminate the effect of the different time dynamics imposed on content popularity by the visitors that are idiosyncratic to the two different portals: the popularity of Digg content submissions initially grows much faster, but it quickly saturates to a constant value, while Youtube videos keep getting views constantly (FIG. 5). As FIG. 7 shows, the average error QRE for Digg articles converges to 0 as we approach the reference time, with variations in the error staying relatively small. On the other hand, the same error measure does not decrease monotonically for Youtube videos until very close to the reference, which means that the growth of popularity of videos still shows considerable fluctuations near the 30$^{th}$ day, too, when the popularity is already almost as large as the reference value.

This fact is further illustrated by FIG. 5, which shows the average normalized popularities for all contents. This is calculated by dividing the popularity counts of individual content by their reference popularities on day 30, and averaging the resulting normalized functions over all content. An important difference that is apparent in the figure is that while Digg stories saturate fairly quickly (in about one day) to their respective reference popularities, Youtube videos keep getting views all throughout their lifetime (at least throughout the data collection period, but it is expected that the trend line continues almost linearly). The rate at which videos keep getting views may naturally differ among videos: less popular videos in the beginning are likely to show a slow pace over longer time scales, too. It is thus not surprising that the fluctuations around the average are not getting suppressed for videos as they age (compare with FIGS. 6A-6D). We also note that the normalized growth curves shown in FIG. 5 are exactly $P(t_i, t_r)$ of equation (11) when $t_r = 30$ days.

The mechanism that gives rise to these two markedly different behaviors is a consequence of the different ways of how users find content on the two portals: on Digg, articles become obsolete fairly quickly, since they oftentimes refer to breaking news, fleeting Internet fads, or technology-related stories that naturally have a limited time period while they interest people. Videos on Youtube, however, are mostly found through search, since due to the sheer amount of videos uploaded constantly it is not possible to match Digg's way of giving exposure to each promoted story on a front page (except for featured videos, but here we did not consider those separately). The faster initial rise of the popularity of videos can be explained by their exposure on the "recently added" tab of Youtube, but after they leave that section of the site, the only way to find them is through keyword search or when they are displayed as related videos with another video that is being watched. It serves thus an explanation to why the predictions converge faster for Digg stories than Youtube videos (10% accuracy is reached within about 2 hours on Digg vs. 10 days on Youtube) that the popularities of Digg content submissions do not change considerably after 2 days.

IV. Exemplary Application Environment

Some embodiments of the management system 10 provide a principled way of prioritizing user-selectable contents when designing dynamic websites. In these embodiments, the predicted popularities of the online contents are translated into a prioritization ordering of the user-selectable contents.

Figure 8:
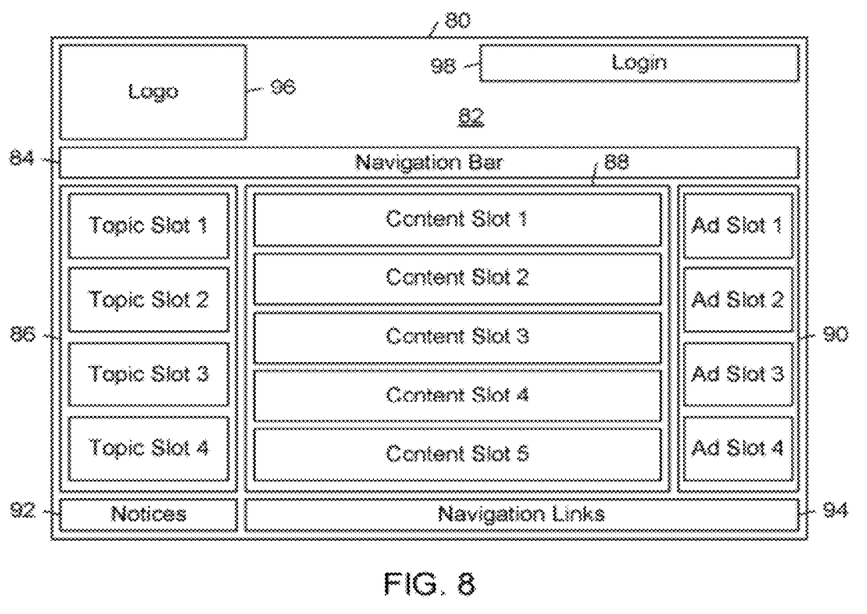
FIG. 8 is a block diagram of an exemplary web page.

FIG. 8 shows an exemplary embodiment of a web page 80 that includes a header section 82, a navigation bar 84, a topics section 86, a contents section 88, an advertisements section 90, notices 92, and navigation links 94. The header section 82 includes a logo 96 and a login section 98 that allows users to sign into their account with a web server that is serving the web page 80. The navigation bar 84 typically contains links (e.g., hypertext links) to other pages of a web site that includes the web page 80. The topics section 86 includes a set of topic slots designated for receiving respective topic-based objects. The contents section 88 includes a set of content slots for receiving respective content-based objects. The advertisements section 90 includes a set of ad slots for receiving respective advertisement-based objects. The notices 92 include various legal (e.g., copyright) and other notices that the web site owner wishes to convey to users of the web site. The navigation links 94 include links to specific pages that are associated with the web site, including links to a search page, a link to a page that describes the terms and conditions relating to the use of the web site, a link to a page that provides a map of the web site, and a link to a help page.

The slots in any of the topics section 86, the contents section 88, and the advertisements section 90 may be filled with different user-selectable objects over time. For example, the slots of the topics section 86 may be populated with various topical user-selectable contents that relate to different topics (e.g., entertainment, politics, finance, nature); the slots of the contents section 88 may be filled with various content-based objects (e.g., stories, articles, and other information available on the World Wide Web); and the slots of the advertisements section 90 may be filled with various advertisements.

In this application environment, embodiments of the management system 10 determine a prioritization order of the user-selectable contents in respective prioritized positions on the web page 80 based on the predicted popularity values. For example, some of these embodiments of the management system 10 position the content having the highest predicted popularity on highly visible parts of the web page 80. Other ones of these embodiments of the management system 10 position the content having the lowest predicted content on highly visible parts of the web page 80. Still other ones of these embodiments of the management system 10 position the contents on the web page 80 such that the predicted revenue is maximized.

V. Exemplary Operating environment

In general, the management system 10 typically includes one or more discrete data processing components, each of which may be in the form of any one of various commercially available data processing chips. In some implementations, the management system 10 is embedded in the hardware of any one of a wide variety of digital and analog electronic devices, including desktop and workstation computers, digital still image cameras, digital video cameras, printers, scanners, and portable electronic devices (e.g., mobile phones, laptop and notebook computers, and personal digital assistants). In some embodiments, the management system 10 executes process instructions (e.g., machine-readable code, such as computer software) in the process of implementing the methods that are described herein. These process instructions, as well as the data generated in the course of their execution, are stored in one or more computer-readable media. Storage devices suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM.

Embodiments of the management system 10 may be implemented by one or more discrete modules (or data processing components) that are not limited to any particular hardware or software configuration, but rather it may be implemented in any computing or processing environment, including in digital electronic circuitry or in computer hardware, firmware, device driver, or software. In some embodiments, the functionalities of the modules are combined into a single data processing component. In some embodiments, the respective functionalities of each of one or more of the modules are performed by a respective set of multiple data processing components. The various modules of the management system 10 may be co-located on a single apparatus or they may be distributed across multiple apparatus; if distributed across multiple apparatus, the modules may communicate with each other over local wired or wireless connections, or they may communicate over global network connections (e.g., communications over the internet).

Figure 9:
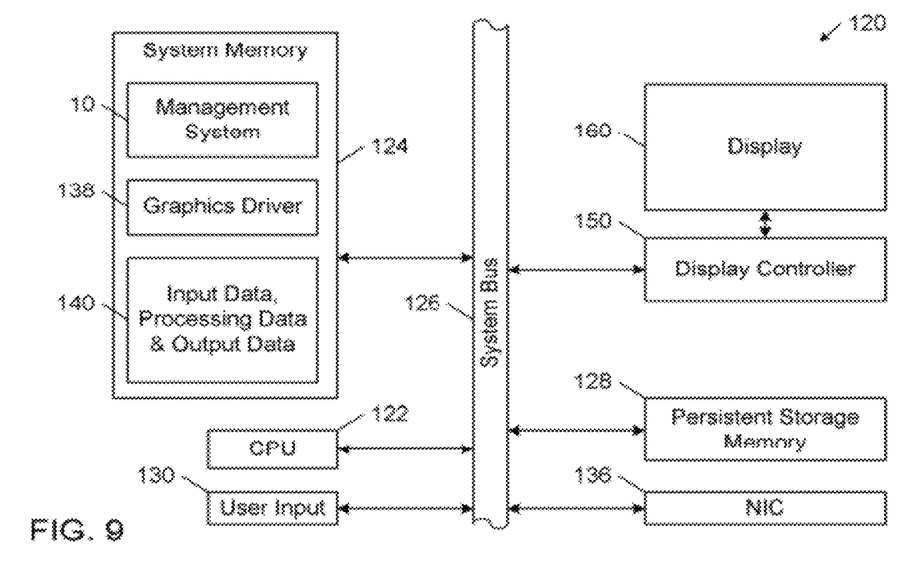
FIG. 9 is a block diagram of a computer system that incorporates an element of the content prioritization system of FIG. 1.

FIG. 9 shows an embodiment of a computer system 120 that can implement any of the embodiments of the management system 10 that are described herein. The computer system 120 includes a processing unit 122 (CPU), a system memory 124, and a system bus 126 that couples processing unit 122 to the various components of the computer system 120. The processing unit 122 typically includes one or more processors, each of which may be in the form of any one of various commercially available processors. The system memory 124 typically includes a read only memory (ROM) that stores a basic input/output system (BIOS) that contains start-up routines for the computer system 120 and a random access memory (RAM). The system bus 126 may be a memory bus, a peripheral bus or a local bus, and may be compatible with any of a variety of bus protocols, including PCI, VESA, Microchannel, ISA, and EISA. The computer system 120 also includes a persistent storage memory 128 (e.g., a hard drive, a floppy drive, a CD ROM drive, magnetic tape drives, flash memory devices, and digital video disks) that is connected to the system bus 126 and contains one or more computer-readable media disks that provide non-volatile or persistent storage for data, data structures and computer-executable instructions.

A user may interact (e.g., enter commands or data) with the computer 120 using one or more input devices 130 (e.g., a keyboard, a computer mouse, a microphone, joystick, and touch pad). Information may be presented through a user interface that is displayed to the user on a display monitor 160, which is controlled by a display controller 150 (implemented by, e.g., a video graphics card). The computer system 120 also typically includes peripheral output devices, such as speakers and a printer. One or more remote computers may be connected to the computer system 120 through a network interface card (NIC) 136.

As shown in FIG. 9, the system memory 124 also stores the management system 10, a graphics driver 138, and processing information 140 that includes input data, processing data, and output data. In some embodiments, the management system 10 interfaces with the graphics driver 138 (e.g., via a DirectX® component of a Microsoft Windows® operating system) to present a user interface on the display monitor 160 for managing and controlling the operation of the management system 10.

VI. Conclusion

The embodiments that are described herein enable a web site to be managed based on the predicted popularity of user-selectable contents (e.g., advertisements, topic tiles, and other variable contents) that are accessible from the web site. These embodiments are able to predict the future popularity (e.g., the number of views, downloads, or clicks) of individual contents (e.g., products, articles, and files) over time from early observations of the initial popularity of those contents and the aggregate user access history of the web site. In some embodiments, the popularity of content (e.g., user contributed content) can be predicted very soon after the submission has been made, by measuring the popularity at an early time. In some embodiments, these predictions are based on a linear model of the correlation between the logarithmically transformed content popularities at early and later times with a normally distributed residual noise on this transformed scale.

Other embodiments are within the scope of the claims.

The invention claimed is:

1. A method, comprising:
    determining a historical popularity value for a user-selectable online content from historical data describing user accesses to the user-selectable online content over a selected period and a determined age of the user-selectable online content;
    ascertaining from the historically popularity value a predicted popularity value describing future popularity of the user-selectable online content at a future time after the selected period; and
    managing a web site from which user-selectable online content is accessible based on the predicted popularity value;
    wherein the determining, the ascertaining, and the managing are performed by a computer.

2. The method of claim 1, wherein the determining comprises determining a count of accesses to the user-selectable online content, normalizing the count by a normalization factor to determine a normalized age of the user-selectable online content, and determining the selected period from the normalized age.

3. The method of claim 1, wherein the ascertaining comprises ascertaining the predicted popularity value based on a linear model that relates a logarithmic transformation of the predicted popularity value to a logarithmic transformation of the historical popularity value.

4. The method of claim 1, wherein the ascertaining comprises ascertaining the predicted popularity value based on a linear regression model of historical popularity values of other user-selectable online contents accessible from the web site.

5. The method of claim 4, wherein the ascertaining comprises ascertaining the value $\hat{N}_s(t_i,t_r)$ of the predicted popularity at an age $t_r$ for each content s by evaluating $$\hat{N}_s(t_i,t_r)=\exp[\ln N_s(t_i)+\beta_0(t_i)+\sigma_0^2/2]$$

wherein $t_i$ is an age of the content s when the prediction was made, $N_s(t_i)$ is a value of popularity of the content s at the age $t_i$, $\beta_0(t_i)$ is a maximum likelihood parameter estimator for an intercept of the linear regression model with slope 1 at the age $t_i$, and $\sigma_0^2$ is a value of variance of residuals of the regression model on a logarithmic scale.

6. The method of claim 1, wherein the ascertaining comprises ascertaining the predicted popularity value based on a constant scaling model of historical popularity values of other user-selectable online contents accessible from the web site.

7. The method of claim 6, wherein the ascertaining comprises ascertaining the value $\hat{N}_s(t_i,t_r)$ of the predicted popularity at an age $t_r$ for each content s by evaluating $$\hat{N}_s(t_i,t_r)=\alpha(t_i,t_r)N_s(t_i)$$

wherein $t_i$ is an age of the content s when the prediction was made, $N_s(t_i)$ is a value of popularity of the content s at the age $t_i$, and $\alpha(t_i,t_r)$ has a parameter value that depends on $t_i$ and $t_r$.

8. The method of claim 7, wherein $\alpha(t_i,t_r)$ is calculated by evaluating $$\alpha(t_i, t_r) = \frac{\sum_c \frac{N_c(t_i)}{N_c(t_r)}}{\sum_c \left[\frac{N_c(t_i)}{N_c(t_r)}\right]^2}$$

wherein $N_c(t_i)$ are popularity values of content in a set c of user-selectable online contents accessible from the web site at the age $t_i$, and $N_c(t_r)$ are popularity values of content in the set c of user-selectable online contents accessible from the web site at the age $t_r$.

9. The method of claim 1, wherein the ascertaining comprises ascertaining the predicted popularity value based on a growth profile model of historical popularity values of other user-selectable online contents accessible from the web site.

10. The method of claim 9, wherein the ascertaining comprises ascertaining the value $\hat{N}_s(t_i, t_r)$ of the predicted popularity at an age $t_r$ for each content s by evaluating $$\hat{N}_s(t_i, t_r) = \frac{N_s(t_i)}{P(t_i, t_r)}$$

wherein $t_i$ is an age of the content s when the prediction was made, $N_s(t_i)$ is a value of popularity of the content s at the age $t_i$, and $P(t_i, t_r)$ is an average of relative popularities for a set of contents accessible from the web site at the ages $t_i$ and $t_r$.

11. The method of claim 1, further comprising performing the determining and the ascertaining for each of multiple user-selected online contents, and the managing comprises determining a prioritization order of the user-selected contents in respective prioritized positions on the web page based on the ascertained predicted popularity values.

12. Apparatus, comprising:
a computer-readable medium storing computer-readable instructions; and
a data processor coupled to the computer-readable medium, operable to execute the instructions, and based at least in part on the execution of the instructions operable to perform operations comprising
determining a historical popularity value for a user-selectable online content from historical data describing user accesses to the user-selectable online content over a selected period and a determined age of the user-selectable online content,
ascertaining from the historically popularity value a predicted popularity value describing future popularity of the user-selectable online content at a future time after the selected period, and
managing a web site from which user-selectable online content is accessible based on the predicted popularity value.

13. The apparatus of claim 12, wherein in the ascertaining the data processor is operable to perform operations comprising ascertaining the predicted popularity value based on a linear model that relates a logarithmic transformation of the predicted popularity value to a logarithmic transformation of the historical popularity value.

14. The apparatus of claim 12, wherein in the ascertaining the data processor is operable to perform operations comprising ascertaining the predicted popularity value based on a linear regression model of historical popularity values of other user-selectable online contents accessible from the web site.

15. The apparatus of claim 12, wherein in the ascertaining the data processor is operable to perform operations comprising ascertaining the predicted popularity value based on a constant scaling model of historical popularity values of other user-selectable online contents accessible from the web site.

16. The apparatus of claim 12, wherein in the ascertaining the data processor is operable to perform operations comprising ascertaining the predicted popularity value based on a growth profile model of historical popularity values of other user-selectable online contents accessible from the web site.

17. At least one non-transitory computer-readable medium having computer-readable program code embodied therein, the computer-readable program code adapted to be executed by a computer to implement a method comprising:
determining a historical popularity value for a user-selectable online content from historical data describing user accesses to the user-selectable online content over a selected period and a determined age of the user-selectable online content;
ascertaining from the historically popularity value a predicted popularity value describing future popularity of the user-selectable online content at a future time after the selected period; and
managing a web site from which user-selectable online content is accessible based on the predicted popularity value.

18. The at least one computer-readable medium of claim 17, wherein the ascertaining comprises ascertaining the predicted popularity value based on a linear model that relates a logarithmic transformation of the predicted popularity value to a logarithmic transformation of the historical popularity value.

19. The at least one computer-readable medium of claim 17, wherein the ascertaining comprises ascertaining the predicted popularity value based on a linear regression model of historical popularity values of other user-selectable online contents accessible from the web site.

20. The at least one computer-readable medium of claim 17, wherein the ascertaining comprises ascertaining the predicted popularity value based on a constant scaling model of historical popularity values of other user-selectable online contents accessible from the web site.

21. The at least one computer-readable medium of claim 17, wherein the ascertaining comprises ascertaining the predicted popularity value based on a growth profile model of historical popularity values of other user-selectable online contents accessible from the web site.

* * * * *

UNITED STATES PATENT AND TRADEMARK OFFICE
CERTIFICATE OF CORRECTION

PATENT NO. : 8,296,253 B2
APPLICATION NO. : 12/484938
DATED : October 23, 2012
INVENTOR(S) : Bernardo Huberman et al.

It is certified that error appears in the above-identified patent and that said Letters Patent is hereby corrected as shown below:

On the Title Page, Item (75), Inventors, in column 1, line 2, delete "Jonas" and insert -- Janos --, therefor.

In the Claims:

In column 17, lines 22-23, in Claim 10, delete " $\hat{N}_s(t_i, t_r) - \dfrac{N_s(t_i)}{P(t_i, t_r)}$ " and insert -- $\hat{N}_s(t_i, t_r) = \dfrac{N_s(t_i)}{P(t_i, t_r)}$ --, therefor.

Signed and Sealed this
Eighteenth Day of June, 2013

Teresa Stanek Rea
*Acting Director of the United States Patent and Trademark Office*